(12) United States Patent
Tanba et al.

(10) Patent No.: US 7,399,256 B2
(45) Date of Patent: Jul. 15, 2008

(54) TRANSMISSION HAVING PLURAL CLUTCHES

(75) Inventors: Toshio Tanba, Nishio (JP); Shiro Ogami, Nishio (JP)

(73) Assignee: Aisin AI Co., Ltd., Nishio-Shi, Aichi-Ken (JP)

( * ) Notice: Subject to any disclaimer, the term of this patent is extended or adjusted under 35 U.S.C. 154(b) by 0 days.

(21) Appl. No.: 11/797,074

(22) Filed: Apr. 30, 2007

(65) Prior Publication Data

US 2007/0202988 A1    Aug. 30, 2007

Related U.S. Application Data

(62) Division of application No. 11/157,052, filed on Jun. 21, 2005, now Pat. No. 7,252,621.

(30) Foreign Application Priority Data

Jun. 21, 2004    (JP)    ............................. 2004-182491

(51) Int. Cl.
    *B60W 10/02*    (2006.01)
(52) U.S. Cl. .......................................... 477/74; 477/71
(58) Field of Classification Search ............... 477/70, 477/77, 74
    See application file for complete search history.

(56) References Cited

U.S. PATENT DOCUMENTS

| 5,915,512 | A | 6/1999 | Adamis et al. |
| 7,137,310 | B2 * | 11/2006 | Berger ........................ 74/330 |
| 7,272,985 | B2 * | 9/2007 | Gumpoltsberger et al. .... 74/331 |
| 7,313,981 | B2 * | 1/2008 | Gumpoltsberger ........... 74/340 |

2005/0061599 A1    3/2005    Budal et al.

FOREIGN PATENT DOCUMENTS

| EP | 1 270 305 A2 | 1/2003 |
| EP | 1 403 124 A2 | 3/2004 |
| EP | 1450075 A2 | 8/2004 |
| EP | 1 467 128 A1 | 10/2004 |
| FR | 2 837 145 A1 | 9/2003 |
| FR | 2 838 684 A1 | 10/2003 |
| GB | 2038964 A * | 7/1980 |
| JP | 2003120764 | 4/2003 |
| JP | 2005003076 A | 1/2005 |
| WO | WO 03/019029 A1 | 3/2003 |

OTHER PUBLICATIONS

European Search Report dated Oct. 26, 2005.

* cited by examiner

*Primary Examiner*—Ha D. Ho
(74) *Attorney, Agent, or Firm*—Buchanan Ingersoll & Rooney PC

(57) ABSTRACT

A transmission having plural clutches includes a first clutch for connecting and disconnecting transmission of driving force to a first input shaft including a driving gear configured to be engaged with a driven gear provided at an output shaft of the transmission driven by a driving force generating device, a second clutch operating independently from the first clutch for connecting and disconnecting transmission of driving force to a second input shaft including a driving gear configured to be engaged with a driven gear provided at the output shaft, a driving force detection device for detecting driving force, a slip detection device for detecting physical quantity related to a slip of a driving wheel, and a device for controlling the second clutch for importing the physical quantity related to the slip and the driving force and for controlling engagement ratio of the second clutch where the first clutch is engaged.

1 Claim, 4 Drawing Sheets

TRANSMISSION HAVING PLURAL CLUTCHES

This application is a divisional of prior application Ser. No. 11/157,052 filed on Jun. 21, 2005, now U.S. Pat. No. 7,252,621, the entire content of which is incorporated herein by reference. This application is also based on and claims priority under 35 U.S.C. §119 with respect to Japanese Patent Application No. 2004-182491 filed on Jun. 21, 2004, the entire content of which is incorporated herein by reference.

FIELD OF THE INVENTION

The present invention relates to a transmission having plural clutches. More particularly, the present invention pertains to a transmission having plural clutches for transmitting driving force for vehicle traveling.

BACKGROUND

A clutch is applied to vehicles in order to connect and disconnect driving force of an engine boarded on a vehicle in a process of transmitting the driving force to driving wheels. A known twin clutch transmission having two clutches is described in JP2003-120764. Generally, a twin clutch transmission includes a first clutch for connecting a first input shaft to an engine, and a second clutch for connecting a second input shaft to the engine. The first input shaft and the second input shaft include plural driving gears having different gear ratio, respectively, and one of the plural driving gears is configured to be engaged with a driven gear of an output shaft. In case a gear is shifted, for example, when gears are shifted from a traveling state where one of driving gears of the first input shaft is engaged and the first clutch is engaged to a state where the engaged gear is shifted to another driving gear of the second input shaft, temporarily, the driving force is shared to be transmitted by means of the both first and second clutches. In other words, a transmitting path of the driving force is shifted from the first clutch to the second clutch by gradually reducing engagement ratio of the first clutch, simultaneously, by gradually increasing engagement ratio of the second clutch from a state where the first clutch is completely engaged and the second clutch is disengaged, and, eventually the complete driving force is transmitted by the second clutch.

Thus, a twin clutch transmission is advantageous in terms of enabling to shift gears smoothly without interrupting transmission of driving force, and of enabling to construct a transmission to have more number of different gear ratios, that is, more number of speeds can be provided compared to a single clutch transmission.

Meanwhile, when a vehicle is suddenly started, a driving force transmission system is likely damaged and driving wheels likely slips because a clutch is suddenly engaged at a state where driving force is increased by increasing engine rpm by opening a throttle. Those disadvantages are common to a twin clutch transmission and a single clutch transmission, and as a counter measurement, driving force of the engine is limited by means of fuel cut and slow engagement operation of the clutch by manual operation. Further, in order to prevent a slip of driving wheels caused by the excessive driving force during the vehicle travels and at a start of the vehicle on rough road such as gravel road which is not paved and snowy or icy road, driving force is controlled by the fuel cut and an anti-lock braking system (ABS), or the like.

Notwithstanding, there is a restriction in terms of time response with the foregoing method, and start control for increasing speed in a short time by controlling the driving force immediately and appropriately has not been achieved. Further, start control and traveling control adapted to conditions such as specification differences among vehicles, personal habits of drivers, and road conditions have not been achieved.

A need thus exists for a transmission having plural clutches which can control driving force immediately and appropriately to prevent driving wheels from slipping when a vehicle starts on a rough road, starts suddenly and travels on rough road, and excels in economical efficiency.

SUMMARY OF THE INVENTION

In light of the foregoing, the present invention provides a transmission having a plurality of clutches, which includes a first clutch for connecting and disconnecting transmission of driving force to a first input shaft including at least one driving gear configured to be engaged with a driven gear provided at an output shaft of the transmission driven by a driving force generating means, a second clutch configured to operate independently from the first clutch, the second clutch for connecting and disconnecting transmission of driving force to a second input shaft including at least one driving gear configured to be engaged with a driven gear provided at the output shaft of the transmission driven by the driving force generating means, a driving force detection means for detecting driving force generated at the driving force generating means, a slip detection means for detecting physical quantity related to a slip of driving wheels, and a means for controlling the second clutch for importing detected result of the physical quantity related to the slip and the driving force and for controlling engagement ratio of the second clutch where the first clutch is engaged.

According to another aspect of the present invention, a control method for a transmission having a plurality of clutches includes steps of engaging a first speed gear of a first input shaft, importing detected result of an engine rotation speed sensor and a throttle opening sensor, releasing a brake, judging whether high level of driving force is generated, gradually engaging a first clutch under a condition that the high level of driving force is not generated, engaging a speed gear provided at a second input shaft, and partially engaging a second clutch while gradually engaging the first clutch under a condition that the high level of driving force is generated, importing detected result from a wheel sensor, judging whether at least one driving wheel is slipping, and increasing engagement ratio of a second clutch under a condition that said at least one driving wheel is slipping, and returning to the step for importing detected result from the wheel sensor.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
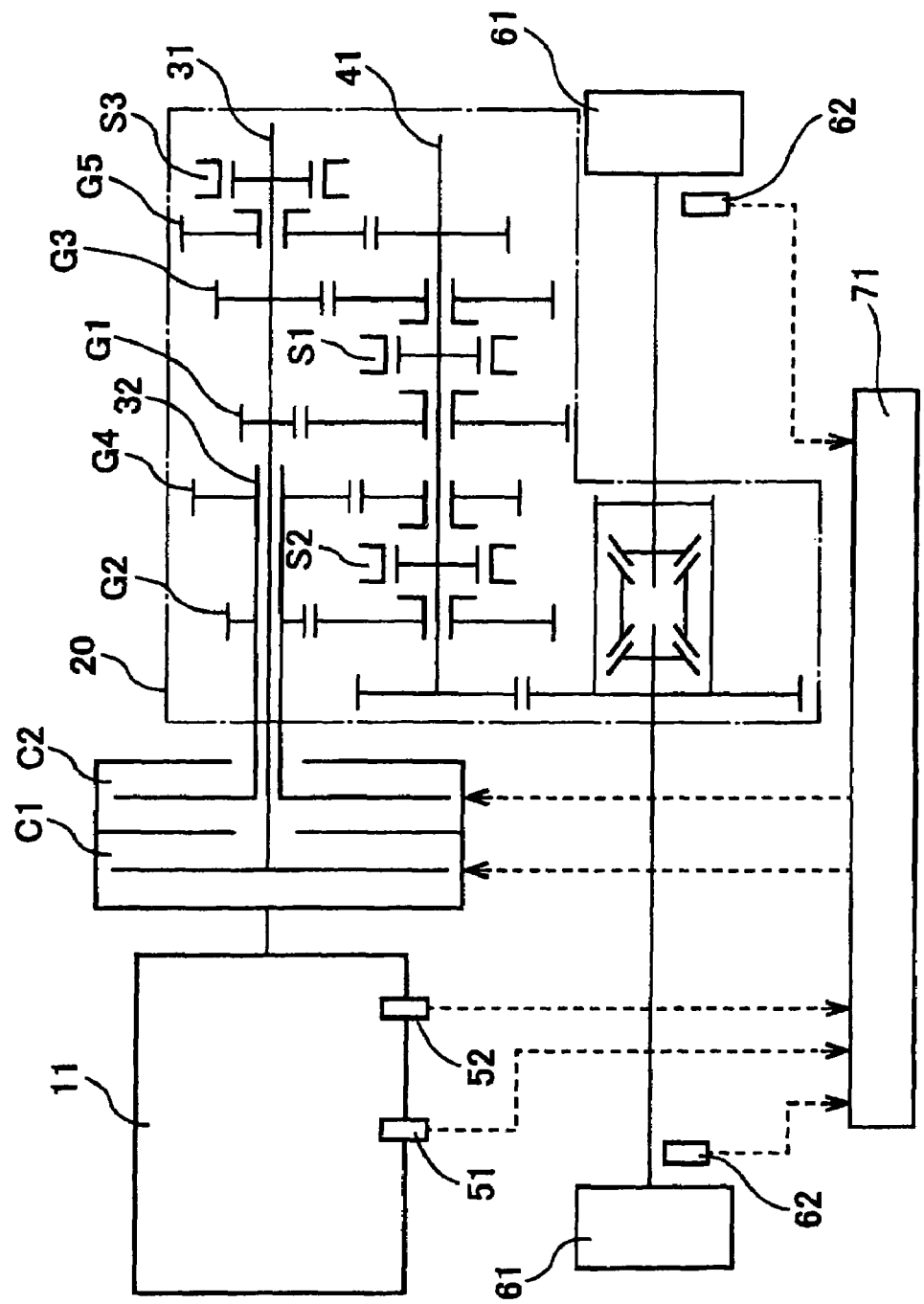
FIG. 1 is a skeleton view showing a transmission having plural clutches according to a first embodiment of the present invention.

Embodiments of the present invention will be explained with reference to illustrations of drawing figures as follows. A first embodiment of the present invention will be explained referring to FIG. 1. Dotted arrows in FIG. 1 show flows of detection signals and control. A transmission having plural clutches includes a first clutch C1, a second clutch C2, a first input shaft 31, a second input shaft 32, an engine rotation speed sensor 51 serving as a driving force detection means, a throttle opening sensor 52 serving as the driving force detection means, a wheel speed sensor 62 serving as a slip detection means, and a driving portion control device 71 serving as a means for controlling a second clutch.

The first clutch C1 transmits rotational driving force of an engine 11 serving as a driving force generating means by connecting the first input shaft 31 of an automatic transmission 20 driven by the engine 11, and does not transmit the rotational driving force of the engine 11 by disconnecting the first input shat 31. Likewise, the second clutch C2 is configured to connect and disconnect the second input shaft 32 of the automatic transmission 20. The first and second clutches C1, C2 operate independently from each other, and are configured to have partially engaged state where driving force can be transmitted with arbitrary engagement ratio.

The first input shat 31 includes a first speed gear G1 for first gear speed, a third speed gear G3 for third gear speed, and a fifth speed gear G5 for fifth gear speed which serve as driving gears. The first speed gear G1 and the third speed gear G3 are configured to be engaged with a driven gear provided at an output shaft 41 by means of operation of a hub sleeve S1. The fifth speed gear G5 is configured to be engaged with a driven gear provided at the output shaft 41 by means of operation of a hub sleeve S3. A hollow pipe is applied as the second input shaft 32, and the first input shaft 31 is penetrated through at internal peripheral side of the second input shat 32. A second speed gear G2 for second gear speed and a fourth speed gear G4 for fourth gear speed serving as driving gears are provided on an external peripheral side of the second input shaft 32. The second speed gear G2 and the fourth speed gear G4 are configured to be engaged with a driven gear provided at the output shaft 41 by means of operation of a hub sleeve S2. Mechanisms are combined so as to transmit the driving force between the output shaft 41 and driving wheels 61. The engine rotation speed sensor 51 and the throttle opening sensor 52 are used as a means for detecting driving force which is generated at the engine 11. Commonly used known sensors are applied as the engine rotation speed sensor 51 and the throttle opening sensor 52, and detected result may be obtained by communication system with a vehicle electronic control device (ECU) or by bifurcation of signal because, generally, output signal is imported into the vehicle electronic control device.

The wheel speed sensor 62 for detecting the rotational speed of the driving wheels 61 is applied as a means for detecting physical quantity which relates to a slip of the driving wheels 61. A commonly used sensor is applied as the wheel speed sensor 62, and, generally, the output signal is imported into the vehicle electronic control device or an anti-lock braking system. Particularly, with the anti-lock braking system, in order to prevent the slip when a brake is applied during the vehicle traveling, vehicle traveling speed is calculated on the basis of rate of change of wheel speed, and degree of the slip is estimated. Thus, it is favorable that the estimated degree of the slip is obtained from the communication system, and the calculation likewise may be carried out with a vehicle on which an anti-lock braking system is not boarded.

The driving portion control device 71 imports the detected result of the physical quantity related to the slip and the driving force, a driving gear of the second input shaft 32 is engaged based on the detected result of the physical quantity, and the engagement ratio of the second clutch C2 is controlled. In order to achieve the foregoing function, a digital type micro controller, which includes an input signal circuit, an internal calculation circuit, a memory circuit, a control output circuit, and a power source circuit, may be applied as the driving portion control device 71. The input signal circuit imports signal outputted from the engine rotation speed sensor 51, the throttle-opening sensor 52, and the wheel speed sensor 62. The imported signal may be amplified, may be converted to digital, or signal with the same level may be obtained by means of communication system, or the like. The internal calculation circuit obtains the physical quantity related to the slip of the driving wheel 61 and the generated driving force of the engine 11 on the basis of the digital signal, compares the physical quantity to a predetermined criterion value and a stipulated value, and determines a control method of the second clutch C2 and a driving gear engaged at the second input shaft 32. The memory circuit memorizes the criterion value, the stipulated value, various constant required for the calculation, and histories of control when the vehicle started, or the like. The control output circuit carries out the control by outputting a command outside.

With the construction of the first embodiment of the present invention, the driving portion control device 71 controls the first clutch C1 and a driving gear engaged at the first input shaft 31, and controls gear shift operation of a general twin clutch transmission.

Figure 2:
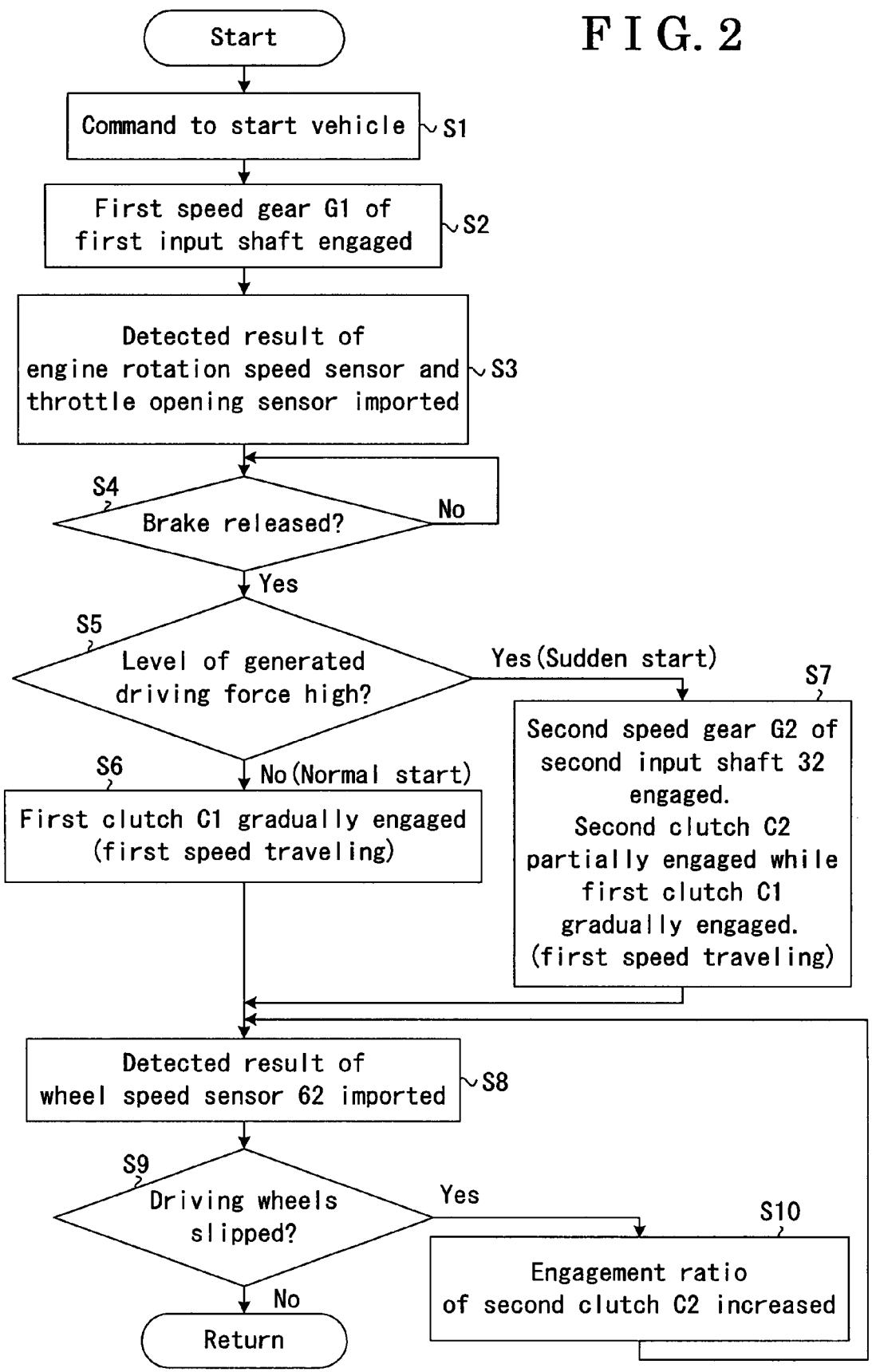
FIG. 2 is an operation control flow view showing an operational control order according to the first embodiment of the present invention.

An operation control procedure when the vehicle starts and operation according to the first embodiment of the present invention will be explained with reference to FIG. 2 as follows.

First, at Step S1, a vehicle driver shifts an automatic transmission to a drive mode to output a command to start a vehicle. Second, at Step S2, the driving portion control device 71 outputs signal so as to engage the first speed gear G1 of the first input shaft 31. At Step S3, the driving portion control device 71 imports detected result of the engine rotation speed sensor 51 and the throttle-opening sensor 52. At Step S4, release of the brake is confirmed. At Step S5, when either one of the engine rpm or degree of the throttle opening is greater than the criterion value, it is judged as a sudden starting operation where greater driving force is generated, and the procedure proceeds to Step S7. When either one of the engine rpm or degree of the throttle opening is less than the criterion value, it is judged as a normal starting operation, and the procedure proceeds to Step S6. At the normal operation, the first clutch is gradually engaged, and the vehicle starts at the first gear speed at Step S6, and the procedure proceeds to Step S8. At the sudden starting operation, the second speed gear G2 of the second input shaft 32 is engaged, the second clutch C2 is partially engaged while gradually engaging the first clutch C1, and the vehicle starts at the first gear speed at Step S7. The detected result of the wheel speed sensor 62 is imported when the vehicle starts traveling and during the vehicle travels (Step S8). At Step S9, the physical quantity related to the slip of the driving wheel 61 is compared with a predetermined stipulated value on the basis of the detected result of the wheel speed sensor 62, and the procedure proceeds to Step 10 when it is judged that the slip is occurred. When it is judged that the slip did not occur, the starting operation is completed, and the operation is returned to the normal shift control. When the slip is occurred, the engagement ratio of the second clutch C2 is increased at Step S10, and the procedure returns to Step S8.

Figure 3:
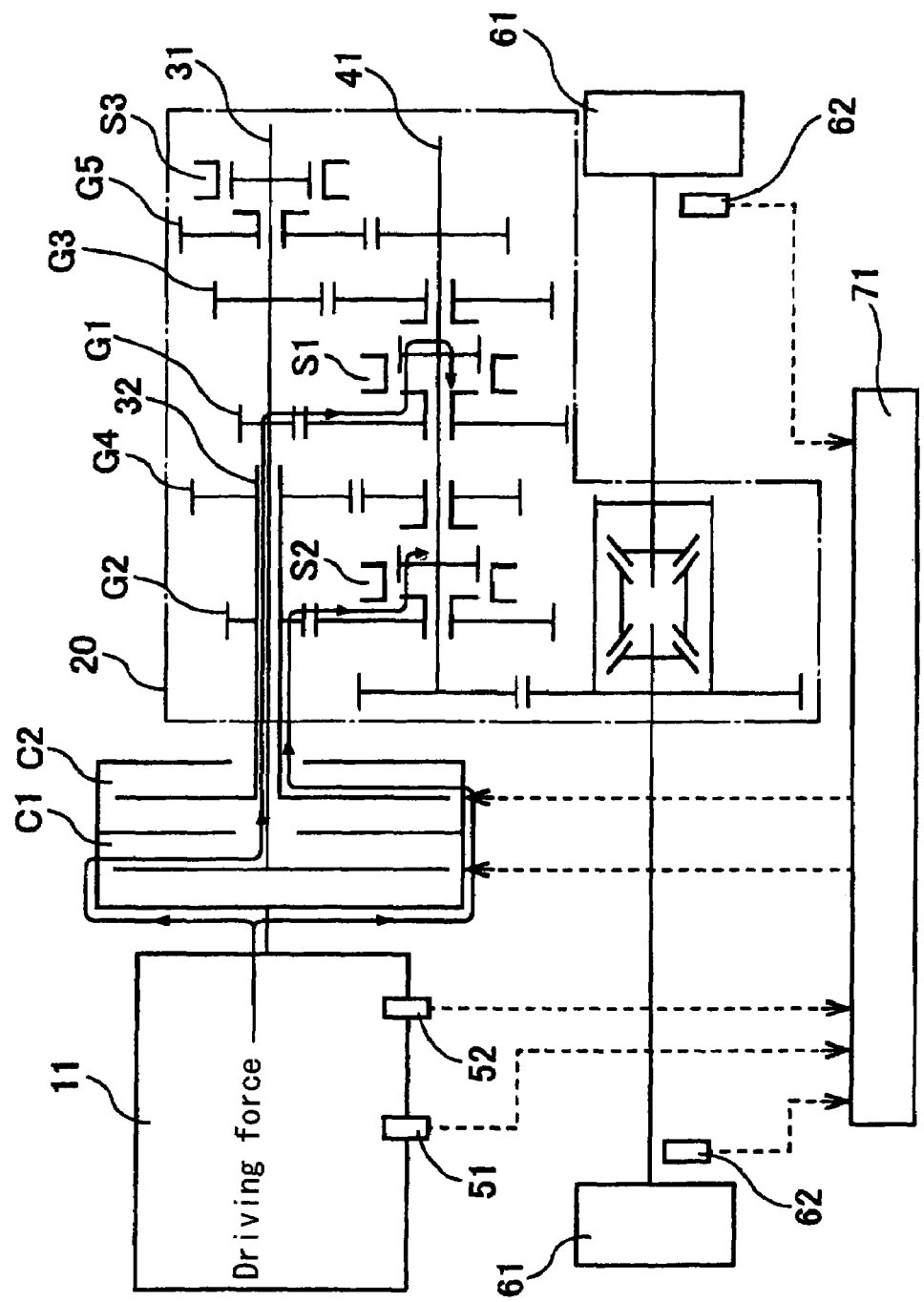
FIG. 3 is a skeleton view showing an operational state according to the first embodiment of the present invention.

FIG. 3 shows a state where the first clutch C1 is engaged and the second clutch C2 is partially engaged at Step S7. As shown with arrows with solid lines, a primal transmitting path of the driving force reaches the output shaft 41 from the engine 11 via the first clutch C1, the first input shaft 31, the first speed gear G1, and the hub sleeve S1. A secondary transmitting path of the driving force reaches the output shaft 41 from the engine 11 via the second clutch C2, the second input shaft 32, the second speed gear G2, and the hub sleeve S2. In this case, because gear ratios between the first speed gear G1 and the second speed gear G2 are different, the first speed gear G1 and the second speed gear G2 make the output shaft 41 rotate with different rotation speeds. Because the first clutch C1 is completely engaged, and the second clutch C2 is partially engaged, the rotation of the outputs shaft 41 is controlled by the gear ratio of the first speed gear G1. In this circumstance, slippage corresponding to difference of the gear ratio is generated at the second clutch, and heat is generated.

As a result, the second clutch C2 serves as a brake, converts a part of the driving force generated at the engine 11 to thermal energy and consumes thereof, and reduces the driving force transmitted from the first clutch C1 to the output shaft 41. Accordingly, the appropriate driving force is transmitted to the driving wheels 61, and the slip can be restrained. Further, when the physical quantity related to the slip is equal to or greater than the stipulated value at Step S9, a ratio for reducing the driving force is increased by increasing the engagement ratio of the second clutch C2 at Step S10, and the appropriate control can be performed immediately.

Although the second speed gear G2 of the second output shaft 31 is engaged at Step S7, the gear engagement is not limited and the fourth speed gear G4 may be geared at Step S7. In this case, the engagement of the second speed gear G2 is preferable because of less risk of damage to the clutch because the gear ratio is close, and further because the engagement of the second speed gear G2 of the second output shaft 31 at Step S7 can be contributed to gear shifting operation to second gear speed sequent to first gear speed when the vehicle starts.

The slip can also be restrained by performing the procedure at Steps 8-10 when the vehicle travels on rough road not only at the start of the vehicle.

Figure 4:
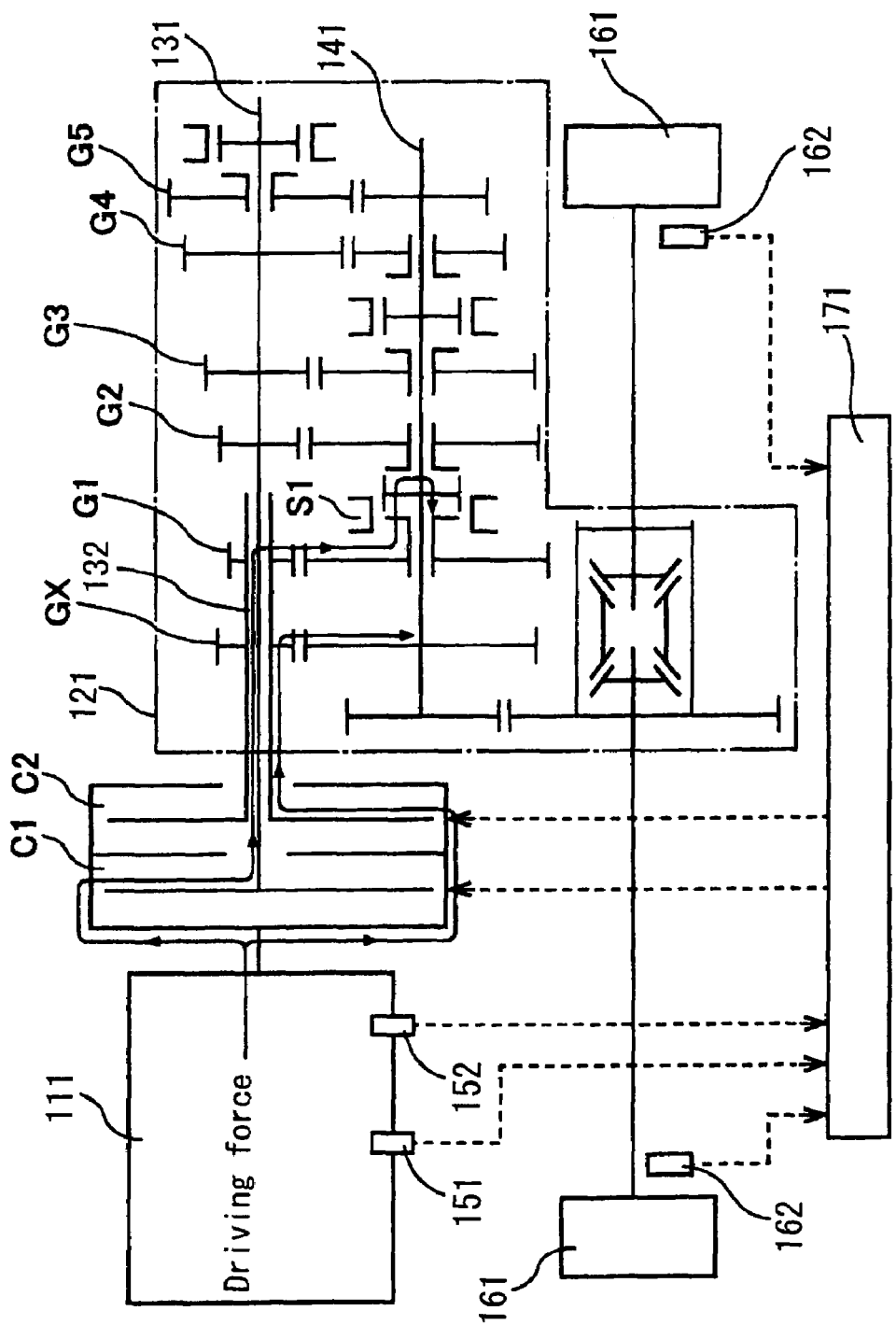
FIG. 4 is a skeleton view showing a second embodiment of the present invention.

A second embodiment of the present invention is explained with reference to FIG. 4, as follows. According to the second embodiment of the present invention, a first input shaft 131 of a transmission 121 includes driving gears G1-G5 for five-speed, and a second input shaft 132 includes a driving force reduction gear GX. Gear ratio of the driving force reduction gear GX is different from any one of driving gears of the first input shaft, and the driving force reduction gear GX is always geared with a driven gear of the output shaft 141. A driving force transmitting path from the second clutch C2 to the output shaft 141 via the second input shaft 132 and the driving force reduction gear GX is not used for the actual vehicle traveling, and converts a part of the driving force to the thermal energy. With this construction, by means of the control and operation likewise the first embodiment of the present invention, the slip of the driving wheel can be restrained.

With the construction of the transmission according to the embodiment of the present invention, the second clutch is configured to serve as a brake. In other words, in order to restrain the slip of the driving wheels caused by the excessive driving force when a vehicle starts, the second clutch is partially engaged at a state where the first clutch is completely engaged, a part of the driving force is converted into frictional heat to be consumed, and appropriate driving force is transmitted to the driving wheels. In order to achieve the foregoing, the transmission according to the embodiment of the present invention includes the first clutch, the second clutch, the driving force detection means, the slip detection means, and the means for controlling the second clutch.

The first clutch and the second clutch are configured to transmit the driving force generated by the respective engagement at the driving force generating means to the first input shaft and the second input shaft of the transmission respectively, and not to transmit the driving force by the disengagement. The first input shaft and the second input shaft include the driving gears respectively, and the first input shaft and the second input shaft are configured so that one of the respective driving gears is engaged with the corresponding driven gear of the output shaft. The output shaft and the driving gear are mechanically connected, and the driving force is transmitted therebetween. Although one of the first input shaft and the second input shaft is configured as a hollow shaft and the other of the first input shaft and the second input shaft is penetrated through the hollow shaft according to the embodiment of the present invention, the construction of the present invention is not limited. Although the driven gear may be provided as a pair with the corresponding driving gear, the construction of the present invention is not limited. Further, the driving gear and the driven gear may be arranged via another gear provided at an intermediate shaft without directly engaging a driving gear and a driven gear. The driving gears of the first and the second input shafts are configured to have gear teeth whose gear ratios are different from one another.

Embodiments of the present invention may be applied to a twin clutch type automatic transmission (AT) where engagement and disengagement of the clutch and gears to be engaged are automatically controlled, and the first input shaft may include odd number speed gears and the second input shaft may include even number speed gears. The driving force is transmitted to the driving wheels by means of one of paths from the first clutch to the output shaft via the first input shaft, or from the second clutch to the output shaft via the second input shaft.

According to the embodiment of the present invention, a manual transmission (MT) where a driver operates may be applied to a first input shaft, and a driving force reduction gear for exclusive use for reducing the driving force may be applied to a second shaft. Gear ratio of the driving force reduction gear is predetermined to be different from any one of driving gears of the first input shaft. Thus, the driving force is transmitted from the first clutch to the output shaft via the first input shaft.

Naturally, a reverse gear is provided at one of the input shaft for both the automatic transmission and the manual transmission.

Although a combustion engine may be applied as the driving force generating means, with the construction of a driving force transmission system according to the embodiment of the present invention, a motor or other means may be applied. In case the combustion engine is applied as the driving force generating means, an engine rotation speed sensor or a throttle opening sensor are generally applied as the driving force detection means, and co-use of the engine rotational sensor and the throttle opening sensor which are strongly related to each other, the reliability of the detection is improved.

It is desired that the slip detection means detects rotation speed of wheels with the wheel speed sensor, rate of change of the rotation speed of the wheels is calculated by means of calculation, and the degree of traveling speed and slip are estimated as the physical quantity related to the slip. The foregoing method is also applied to an anti-lock braking system.

The means for controlling the second clutch imports detected result of the physical quantity related to the driving force and the slip, and controls the engagement ratio of the second clutch and the selection of the driving gear to be geared with the second input shaft on the basis of the detected result. In order to achieve the foregoing function, a digital type micro controller may be applied as the means for controlling the second clutch.

A method for operation control and an operation of the transmission when the vehicle starts according to the embodiment of the present invention will be explained as follows. The generated driving force is detected by the driving force detection means, and the generated driving force is monitored by means of the means for controlling the second clutch. Thus, when the first clutch is engaged and one of the driving gears of the first input shaft is engaged when the vehicle starts, it is recognizable and foreseeable at the means for controlling the second clutch that the sudden start is intended and the driving wheels is likely to slip if the degree of generated driving force is significant. When the generated driving force is greater than the predetermined criterion value and the slip of the driving wheels is foreseen, the means for controlling the second clutch makes one of the driving gears of the second input shaft engage so that the second clutch assumes partially engaged state, and the engagement ratio of the second clutch is controlled to be maintained to be less than the engagement ratio of the first clutch.

In this case, because the gear ratios of the first input shaft and the second input shaft are different from each other, the first input shaft and the second input shaft manage to rotate the output shaft with different rotational number from each other. Because the engagement ratio of the first clutch is controlled to be greater than the engagement ratio of the second clutch, the first input shaft connected by means of the first clutch controls the rotation of the output shaft. Slippage is generated at the second clutch because of the partially engaged state, and the frictional heat is generated. Accordingly, a part of the generated driving force is transmitted to the output shaft via the first input shaft, the rest of the driving force is consumed as the thermal energy at the second clutch, and eventually the driving force transmitted from the output shaft to the driving wheel is reduced to be appropriate level.

The driving gear engaged at the first input shaft when the vehicle starts is normally the first speed gear. Any gear can be engaged at the second input shaft as long as the gear ratio is different from the driving gear engaged at the first input shaft, and, in an extreme instance, a reverse gear can be applied. In order to restrain the wastage of the second clutch because of the frictional heat, it is preferable to provide the second speed gear whose gear ratio is closer to the gear ratio of the first speed gear. In this case, because the naming of the first input shaft and the second input shaft, and the first clutch and the second clutch is just for explanatory purpose, and the first and the second clutch/input shaft can be switched each other and this change does not effect anything.

Next, a control method for operation and an operation after the vehicle started and during the vehicle traveling will be explained as follows. With the construction of the embodiment of the present invention, the slip detection means detects the physical quantity related to the slip of the driving wheel, and the means for controlling the second clutch monitors physical quantity related to the slip. Accordingly, when the physical quantity related to the slip exceeds the criterion value, the driving force transmitted to the driving wheel can be made to be appropriate level by consuming the driving force as the thermal energy by partially engaging the second clutch.

When the physical quantity related to the slip is greater than the predetermined stipulated value, it is preferable to further reduce the driving force to be transmitted by increasing the engagement ratio of the second clutch. When the physical quantity related to the slip is less than the predetermined stipulated value, it is preferable to recover the driving force to be transmitted by reducing the engagement ratio of the second clutch. By conducting the foregoing control, the driving force can be transmitted whereas the slip is always restrained. Further, because the engagement ratio of the second clutch can be controlled immediately without time lag, the response can be dramatically improved compared to a known control methods such as the fuel cut.

The criterion value of the driving force and the criterion value and stipulated value of the physical quantity related to the slip may be predetermined at the means for controlling the second clutch in accordance with a vehicle specification. Further, optimization control for achieving appropriate level of the driving force one by one in accordance with habits of a driver can be conducted on the basis of the control history when the vehicle started and during the vehicle traveling in the past.

According to the embodiment of the present invention, the second clutch is intentionally partially engaged where the first clutch is completely engaged. Accordingly, driving force from the first input shaft and the second input shaft whose rotation speeds are different from one another is transmitted to the output shaft, and the driving force of the output shaft is reduced in accordance with the engagement ratio of the second clutch, and thus the driving force transmitted to the driving wheels is reduced. On the other hand, with a known twin clutch transmission device, a shift operation is conducted by changing the driving force from one clutch to the other clutch where the both first and the second clutches are partially engaged state. Accordingly, purposes and methods of the known twin clutch transmission device are different from the operation according to the embodiment of the present invention.

Although the means for controlling the second clutch has been explained as a control means for achieving the appropriate level of the driving force by controlling the second clutch and the driving gear engaged at the second input shaft, the construction of the present invention is not limited. In other words, the means for controlling the second clutch may also serve as a control portion of the known twin clutch transmission by controlling a first clutch and a driving gear engaged at the first input shaft. Although the transmission according to the present invention is differentiated from a known twin clutch transmission in terms of intentionally converting the driving force to the thermal energy by means of the second clutch, and of a method for an operation control to achieve thereof, the construction of the known device and the transmission according to the present invention is similar, and economically efficient transmission can be provided by including functions of the both devices.

With the construction of the transmission having plural clutches according to the embodiment of the present invention, because the engagement ratio of the second clutch is controlled where the first clutch is engaged when the driving wheels slips during the vehicle traveling or when the vehicle starts suddenly, the excessively generated driving force is consumed as the thermal energy at the second clutch, the driving force transmitted to the driving wheel is immediately reduced to be appropriate level, and the slip is restrained.

With the construction that the engagement ratio of the second clutch is controlled to be increased and decreased of the second clutch in accordance with the degree of the physical quantity related to the slip according to the embodiment of the present invention, the driving force can be transmitted in a state where the slip is always restrained.

With the construction that the means for controlling the second clutch controls not only the second clutch and the driving gear engaged at the second input shaft, but also the first clutch and the driving gear engaged at the first input shaft, the control means for the second clutch enables to also have a role of the control portion of known twin clutch transmission, which provides a economically efficient transmission.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A control method for a transmission having a plurality of clutches, comprising:
   engaging a first speed gear of a first input shaft;
   importing detected result of an engine rotation speed sensor and a throttle-opening sensor;
   releasing a brake;
   judging whether high level of driving force is generated;
   gradually engaging a first clutch under a condition that the high level of driving force is not generated;
   engaging a speed gear provided at a second input shaft, and partially engaging a second clutch while gradually engaging the first clutch under a condition that the high level of driving force is generated;
   importing detected result from a wheel sensor;
   judging whether at least one driving wheel is slipping; and
   increasing engagement ratio of the second clutch under a condition that said at least one driving wheel is slipping, and returning to the step for importing detected result from the wheel sensor.

* * * * *